US008630632B2

(12) United States Patent
Cormier et al.

(10) Patent No.: US 8,630,632 B2
(45) Date of Patent: Jan. 14, 2014

(54) MANAGING MOBILE COMMUNICATION IDENTITY

(75) Inventors: Jean-Philippe Paul Cormier, Ottawa (CA); Johanna Lisa Dwyer, Kanata (CA)

(73) Assignee: BlackBerry Limited, Waterloo (CA)

( * ) Notice: Subject to any disclaimer, the term of this patent is extended or adjusted under 35 U.S.C. 154(b) by 65 days.

(21) Appl. No.: 13/079,547

(22) Filed: Apr. 4, 2011

(65) Prior Publication Data

US 2012/0252424 A1     Oct. 4, 2012

(51) Int. Cl.
*H04M 3/00* (2006.01)

(52) U.S. Cl.
USPC ............ 455/418; 455/410; 455/419; 455/558

(58) Field of Classification Search
USPC ........................................................ 455/418
See application file for complete search history.

(56) References Cited

U.S. PATENT DOCUMENTS

| | | | |
|---|---|---|---|
| 5,854,982 A | 12/1998 | Chambers et al. | |
| 6,278,774 B1 * | 8/2001 | Yoshino | 379/100.14 |
| 8,036,356 B1 * | 10/2011 | Ghosh et al. | 379/142.1 |
| 2002/0193100 A1 * | 12/2002 | Riffe et al. | 455/417 |
| 2005/0153741 A1 | 7/2005 | Chen et al. | |
| 2005/0192035 A1 | 9/2005 | Jiang | |
| 2006/0183500 A1 | 8/2006 | Choi | |
| 2007/0093243 A1 | 4/2007 | Kapadekar et al. | |
| 2008/0064367 A1 * | 3/2008 | Nath et al. | 455/411 |
| 2008/0171532 A1 * | 7/2008 | Shieh et al. | 455/410 |
| 2009/0215425 A1 * | 8/2009 | Ebersberger | 455/404.2 |
| 2010/0254376 A1 | 10/2010 | Wood et al. | |
| 2010/0329443 A1 * | 12/2010 | Montaner Gutierrez et al. | 379/221.01 |
| 2011/0238845 A1 * | 9/2011 | Keller et al. | 709/227 |

FOREIGN PATENT DOCUMENTS

EP      2219142 A1      8/2010

OTHER PUBLICATIONS

Extended European Search report mailed Sep. 19, 2011. In corresponding application No. 11161070.5.
Office Action mailed Sep. 16, 2013, in corresponding Canadian patent application No. 2,769,369.

* cited by examiner

*Primary Examiner* — Charles Appiah
*Assistant Examiner* — Mazda Sabouri
(74) *Attorney, Agent, or Firm* — Novak Druce Connolly Bove + Quigg LLP

(57) ABSTRACT

The disclosure addresses technology for identifying a mobile subscriber integrated services digital network number (MSISDN) of a mobile communication device in an extended enterprise voice network comprising the mobile device, an enterprise server, a private branch exchange (PBX), and a service management platform (SMP). The need to determine an MSISDN is detected. At least one of disable calling line identification restriction at the mobile communication device, and enable calling line identification restriction override at the SMP is implemented. The SMP is contacted from the mobile communication device. The incoming contact is identified at the SMP. The MSISDN is transmitted to the mobile device from the SMP. The transmitted MSISDN is written to the SIM card.

23 Claims, 5 Drawing Sheets

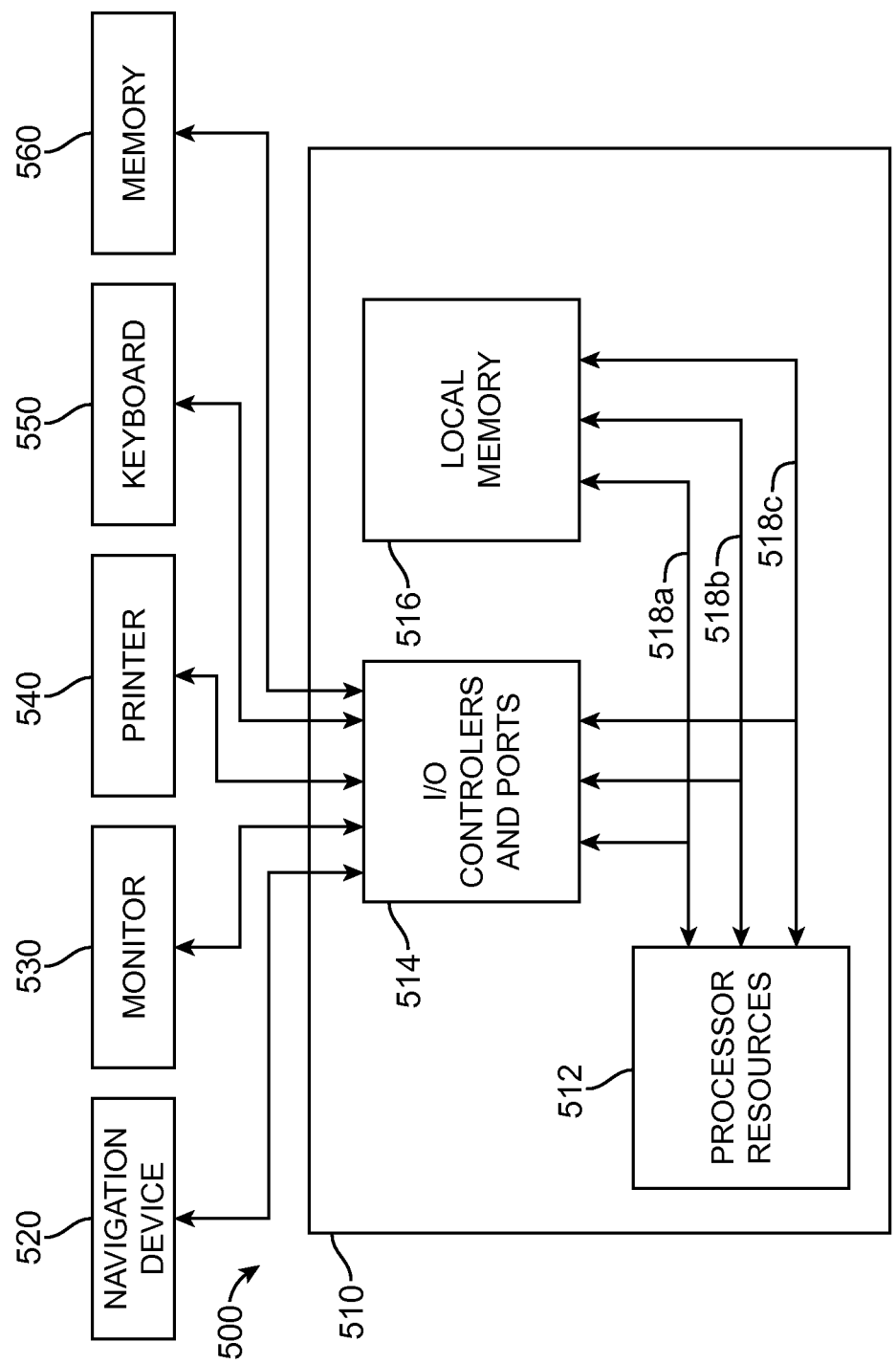

MANAGING MOBILE COMMUNICATION IDENTITY

FIELD

The technology disclosed herein (the "technology") relates to managing mobile communication identity. Exemplary implementations relate to maintaining an accurate Mobile Subscriber Integrated Digital Services Network (MSISDN) identity.

BRIEF DESCRIPTION OF THE DRAWINGS

Reference will now be made, by way of example, to the accompanying drawings which show example implementations of the technology.

FIG. 5 illustrates a data processing architecture suitable for storing a computer program product of the present technology and for executing the program code of the computer program product.

DETAILED DESCRIPTION

Reference now will be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

Figure 3:
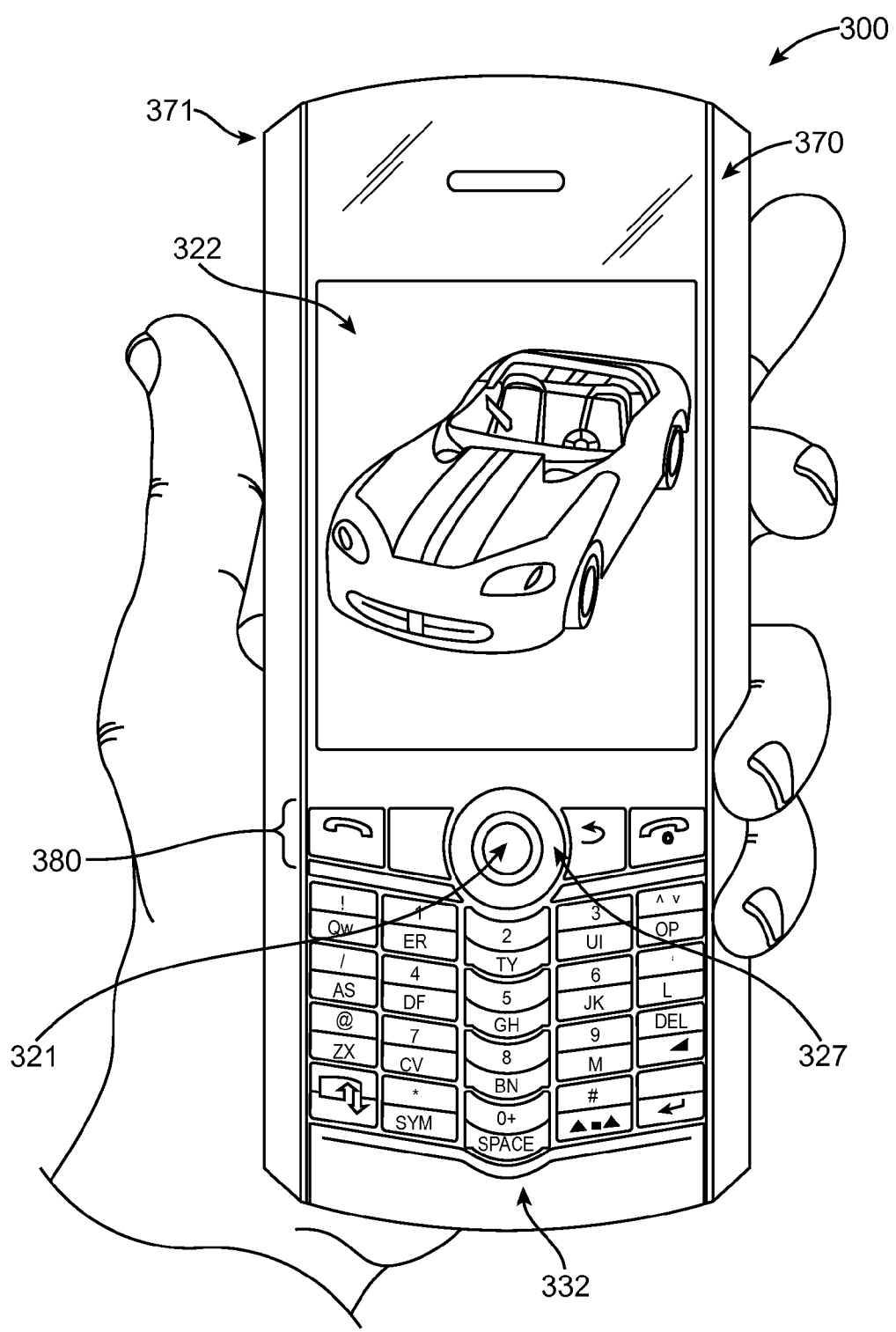
FIG. 3 illustrates an exemplary mobile communication device.

As will be appreciated from FIG. 3, an exemplary mobile communication device 300 (as an example of 11) comprises a display 322 located above a keyboard 332 constituting a user input means that is suitable for accommodating textual input to the device 300. In some implementations, the keyboard 332 can be part of a touch screen display. The front face 370 of the device 300 has a navigation row 380. As shown, the device 300 is of uni-body construction, also known as a "candy-bar" design.

The device 300 may include an auxiliary input that acts as a cursor navigation tool 327 and that may be also exteriorly located upon the front face 370 of the device 300. The front face location of a cursor navigation tool 327 allows the tool to be thumb-actuable, e.g., like the keys of the keyboard 332. Some implementations of the technology provide the navigation tool 327 in the form of a trackball 321 that may be utilized to instruct two-dimensional screen cursor movement in substantially any direction, as well as act as an actuator when the trackball 321 is depressed like a button. Other implementations can provide the navigation tool in the form of a track pad, a touchpad, a pointing stick, joystick, graphics tablet, or combinations thereof. The placement of the navigation tool 327 can be above the keyboard 332 and below the display screen 322; here, it may avoid interference during keyboarding and does not block the operator's view of the display screen 322 during use.

The device 300 may be configured to send and receive messages. The device 300 includes a body 371 that can, in some implementations, be configured to be held in one hand by an operator of the device 300 during text entry. A display 322 is included that is located on a front face 370 of the body 371 and upon which information is displayed to the operator, e.g., during text entry. The device 300 may also be configured to send and receive voice communications such as mobile telephone calls. The device 300 also can include a camera (not shown) to allow the device 300 to take electronic photographs that can be referred to as photos or pictures. Further, the device 300 can be configured to operate a web browser.

Figure 4:
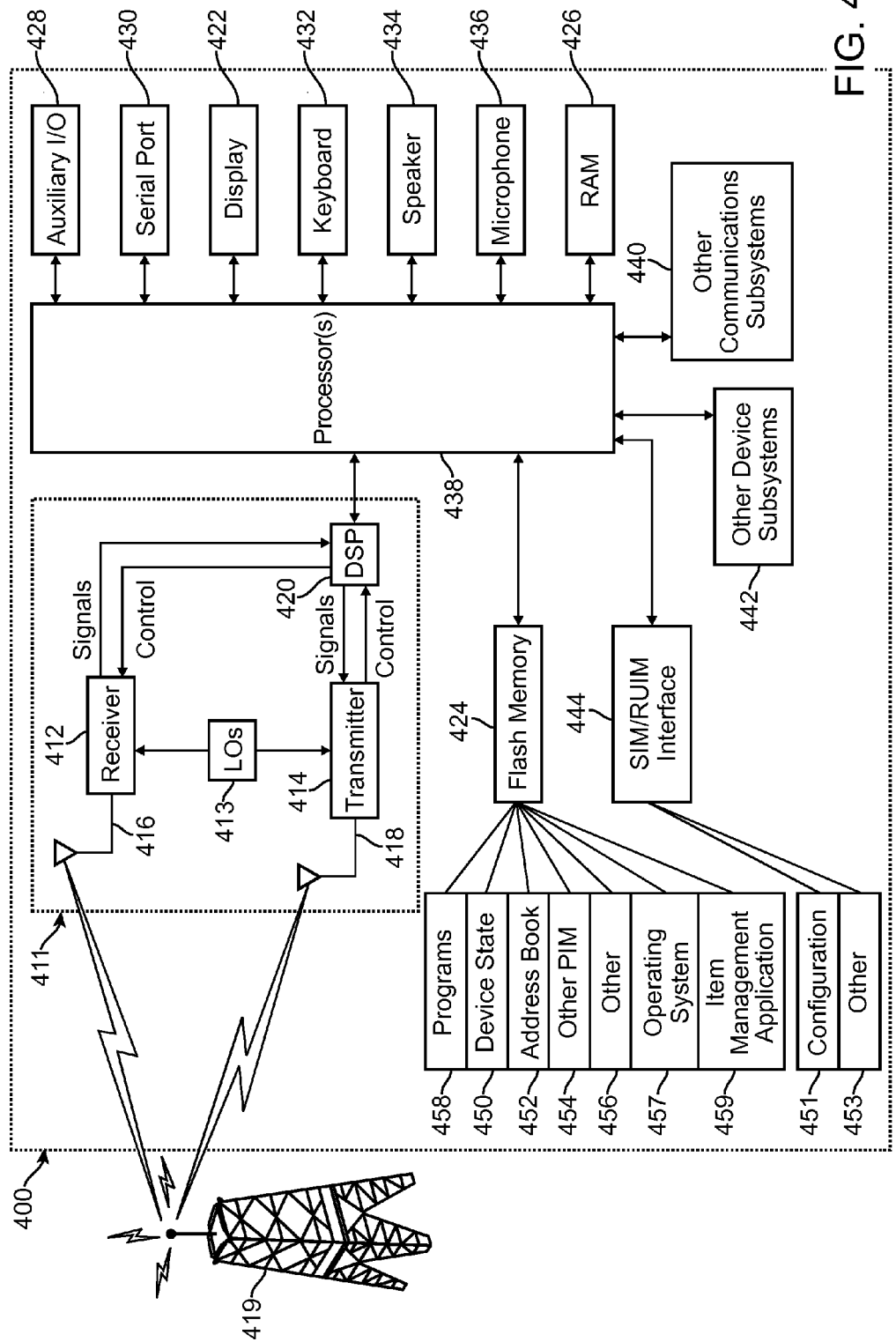
FIG. 4 illustrates a block diagram of a communication device.

Referring to FIG. 4, a block diagram of a communication device, such as 300 and 11, in accordance with an exemplary implementation is illustrated. As shown, the device 400 includes a microprocessor 438 that controls the operation of the communication device 400. A communication subsystem 411 performs communication transmission and reception with the wireless network 419. The microprocessor 438 further can be communicatively coupled with an auxiliary input/output (I/O) subsystem 428 that can be communicatively coupled to the communication device 400. In at least one implementation, the microprocessor 438 can be communicatively coupled to a serial port (for example, a Universal Serial Bus port) 430 that can allow for communication with other devices or systems via the serial port 430. A display 422 (e.g., 322) can be communicatively coupled to microprocessor 438 to allow for display of information to an operator of the communication device 400. When the communication device 400 is equipped with a keyboard 432 (e.g., 332), the keyboard can also be communicatively coupled with the microprocessor 438. The communication device 400 can include a speaker 434, a microphone 436, random access memory (RAM) 426, and flash memory 424, all of which may be communicatively coupled to the microprocessor 438. Other similar components may be provided on the communication device 400 as well and optionally communicatively coupled to the microprocessor 438. Other communication subsystems 440 and other communication device subsystems 442 are generally indicated as being functionally connected with the microprocessor 438 as well. An example of a communication subsystem 440 is a short range communication system such as BLUETOOTH® communication module or a WI-FI® communication module (a communication module in compliance with IEEE 802.11b) and associated circuits and components. Additionally, the microprocessor 438 is able to perform operating system functions and enables execution of programs on the communication device 400. In some implementations not all of the above components are included in the communication device 400. For example, in at least one implementation, the keyboard 432 is not provided as a separate component and is instead integrated with a touch screen as described below.

The auxiliary I/O subsystem 428 can take the form of a variety of different navigation tools (multi-directional or single-directional) such as a trackball navigation tool 321, as illustrated in the exemplary implementation shown in FIG. 3, or a thumbwheel, a navigation pad, a joystick, touch-sensitive interface, or other I/O interface. These navigation tools may be located on the front surface of the communication device 400 or may be located on any exterior surface of the communication device 400. Other auxiliary I/O subsystems may include external display devices and externally connected keyboards (not shown). While the above examples have been provided in relation to the auxiliary I/O subsystem 428, other subsystems capable of providing input or receiving output from the communication device 400 are considered within the scope of this disclosure. Additionally, other keys may be placed along the side of the communication device 300 to function as escape keys, volume control keys, scrolling keys, power switches, or user programmable keys, and may likewise be programmed accordingly.

The keyboard 432 can include a plurality of keys that can be of a physical nature such as actuable buttons, or they can be of a software nature, typically constituted by representations of physical keys on a display 422 (referred to herein as "virtual keys"). It is also contemplated that the user input can be provided as a combination of the two types of keys. Each key of the plurality of keys is associated with at least one action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display 422, which in one implementation is enabled by touching the display 422, for example, with a stylus, finger, finger tip, finger nail, or other pointer, to generate the character or activate the indicated command or function. Some examples of displays 422 capable of detecting a touch include resistive, capacitive, projected capacitive, infrared and surface acoustic wave (SAW) touch screens.

Physical and virtual keys can be combined in many different ways as appreciated by those skilled in the art. In one implementation, physical and virtual keys are combined such that the plurality of enabled keys for a particular program or feature of the communication device 400 is shown on the display 422 in the same configuration as the physical keys. Using this configuration, the operator can select the appropriate physical key corresponding to what is shown on the display 422. Thus, the desired character, command or function is obtained by depressing the physical key corresponding to the character, command or function displayed at a corresponding position on the display 422, rather than touching the display 422.

Furthermore, the communication device 400 is equipped with components to enable operation of various programs, as shown in FIG. 4. In an exemplary implementation, the flash memory 424 is enabled to provide a storage location for the operating system 457, device programs 458, and data. The operating system 457 is generally configured to manage other programs 458 that are also stored in memory 424 and executable on the processor 438. The operating system 457 honors requests for services made by programs 458 through predefined program 458 interfaces. More specifically, the operating system 457 typically determines the order in which multiple programs 458 are executed on the processor 438 and the execution time allotted for each program 458, manages the sharing of memory 424 among multiple programs 458, handles input and output to and from other device subsystems 442, and so on. In addition, operators can typically interact directly with the operating system 457 through a user interface usually including the keyboard 432 and display 422. While in an exemplary implementation the operating system 457 is stored in flash memory 424, the operating system 457 in other implementations is stored in read-only memory (ROM) or similar storage element (not shown). As those skilled in the art will appreciate, the operating system 457, device program 458, or parts thereof, may be loaded in RAM 426 or other volatile memory.

In some implementations, the flash memory 424 may contain programs 458 for execution on the device 400, including—but not limited to—an address book 452, a personal information manager (PIM) 454, and a device state 450. Furthermore, programs 458, such as social software, and other information 456 including data can be segregated upon storage in the flash memory 424 of the device 400.

When the communication device 400 is enabled for two-way communication within the wireless communication network 419, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 400 may use a unique identifier to enable the communication device 400 to transmit and receive signals from the communication network 419. Other systems may not use such identifying information. GPRS, UMTS, and EDGE use a Subscriber Identity Module (SIM) in order to allow communication with the communication network 419. Likewise, most CDMA systems use a Removable User Identity Module (RUIM) in order to communicate with the CDMA network. The RUIM and SIM card can be used in multiple different communication devices 400. The communication device 400 can be configured to operate some features without a SIM/RUIM card, but it will not necessarily be able to communicate with the network 419. A SIM/RUIM interface 444 located within the communication device 400 allows for removal or insertion of a SIM/RUIM card (not shown). The SIM/RUIM card features memory and holds key configurations 451, and other information 453 such as identification and subscriber related information. With a properly enabled communication device 400, two-way communication between the communication device 400 and communication network 419 is possible.

If the communication device 400 is enabled as described above or the communication network 419 does not use such enablement, the two-way communication enabled communication device 400 is able to both transmit and receive information from the communication network 419. The transfer of communication can be from the communication device 400 or to the communication device 400. In order to communicate with the communication network 419, the device 400 can be equipped with an integral or internal antenna 418 for transmitting signals to the communication network 419. Likewise the device 400 can be equipped with another antenna 416 for receiving communication from the communication network 419. These antennae (416, 418) in another exemplary implementation are combined into a single antenna (not shown). As one skilled in the art would appreciate, the antenna or antennae (416, 418) in another implementation can be externally mounted on the communication device 400.

When equipped for two-way communication, the communication device 400 features a communication subsystem 411. As is understood in the art, this communication subsystem 411 is modified so that it can support the operational needs of the communication device 400. The subsystem 411 includes a transmitter 414 and receiver 412 including the associated antenna or antennae (416, 418) as described above, local oscillators (LOs) 413, and a processing module that in the presently described exemplary implementation is a digital signal processor (DSP) 420.

It is contemplated that communication by the communication device 400 with the wireless network 419 can be any type of communication that both the wireless network 419 and communication device 400 are enabled to transmit, receive and process. In general, these can be classified as voice or data, or both voice and data. Voice communication generally refers to communication in which signals for audible sounds are transmitted by the communication device 400 through the communication network 419. Data generally refers to all other types of communication that the communication device 400 is capable of performing within the constraints of the wireless network 419.

Example device programs that can depend on such data include email, contacts and calendars. For each such program, synchronization with home-based versions of the program can be desirable for either or both of their long term and short term utility. As an example, emails are often time-sensitive, so substantially real time (or near-real time) synchronization may be desired. Contacts, on the other hand, can be usually updated less frequently without inconvenience. Therefore, the utility of the communication device 400 is enhanced when connectable within a communication system, and when connectable on a wireless basis in a network 419 in which voice, text messaging, and other data transfer are accommodated. Device 400 can include programs such as a web browser, a file browser, and client programs for interacting with server programs. Devices, e.g., 11, 300, 400, for use in the technology can be characterized by an identification number assigned to the device. Such identification numbers cannot be changed and are locked to each device.

Figure 1:
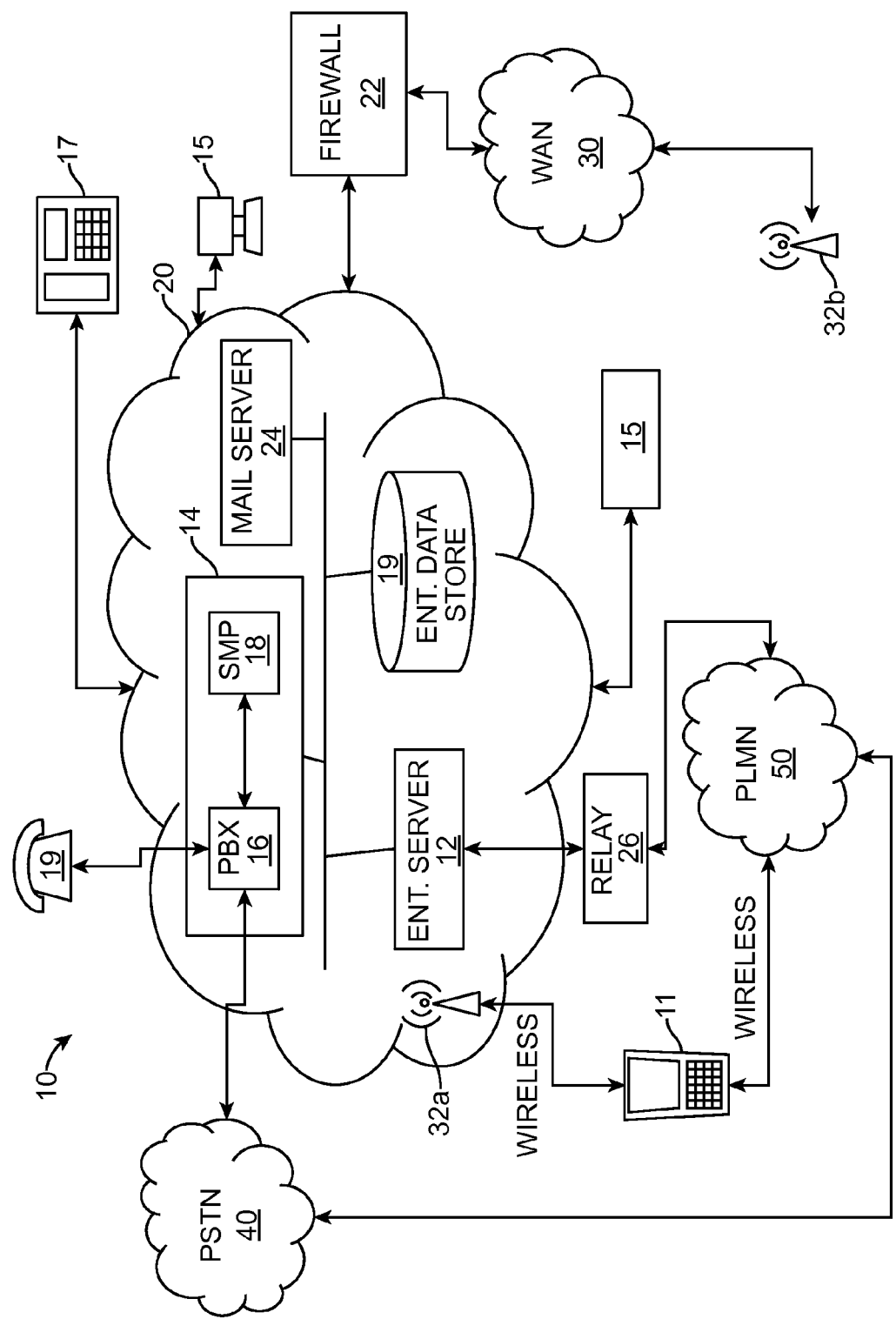
FIG. 1 illustrates in block diagram form, a communication system in which implementations of the technology can be applied.

Implementations of the technology can be realized as programming across the architectural elements identified in FIG. 1, FIG. 3, and FIG. 4. In some implementations, the programming is entirely on the mobile communications device 11. In some implementations, programming for the technology is on the mobile communications device 11, while data used by the mobile communications device 11 is on the wireless connector system 120 or a network server such as content server 134, messaging server 132, or application server 136. In some implementations, programming for the technology can be realized on a remote server. Allocation of functionality among architectural elements can be a function of several factors including latency, processing resource availability and efficient usage, storage availability and efficient usage, and revenue opportunities.

Reference is now made to FIG. 1, which shows, in block diagram form, an example system, generally designated 10, for the control and management of communications. The system 10 includes an enterprise or business system 20, which in many implementations includes a local area network (LAN). In the description below, the enterprise or business system 20 may be referred to as an enterprise network 20. It will be appreciated that the enterprise network 20 may include more than one network and may be located in multiple geographic areas in some implementations.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various implementations, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as a user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some implementations. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is information such as: message address information, such as an e-mail address; and enterprise telephone exchange, e.g., a phone exchange that can be associated with a digital telephone set, e.g., 17. Information on users of the enterprise network 24 and its resources can be stored in an enterprise data store 19, e.g., implemented with Microsoft® Active Directory. Messages addressed to a user message address are stored on the enterprise network 20 in the mail server 24. The messages may be retrieved by a user using a messaging application, such as an e-mail client application. The messaging application may be operating on a user's computer 15 connected to the enterprise network 20 within the enterprise. In some implementations, a user may be permitted to access stored messages using a remote computer, for example at another location via the WAN 30 using a VPN connection. Using the messaging application, a user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to a user's mobile device 11 and to relay incoming e-mail messages composed and sent via the mobile device 11 to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on a computer 15.

As is typical in many enterprises, the enterprise network 20 includes a Private Branch eXchange system (although in various implementations the PBX may be a standard PBX or an IP-PBX, for simplicity the description below uses the term PBX system to refer to both) 16 having a connection with the PSTN 40 for routing incoming and outgoing voice calls for the enterprise. The PBX system 16 is connected to the PSTN 40 via DID trunks or PRI trunks, for example. The PBX system 16 may use ISDN signaling protocols for setting up and tearing down circuit-switched connections through the PSTN 40 and related signaling and communications. In some implementations, the PBX system 16 may be connected to one or more conventional analog telephones 19. The PBX system 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX system 16 to the PSTN 40 or incoming from the PSTN 40 to the PBX system 16 are typically circuit-switched calls. Within the enterprise, e.g., between the PBX system 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX system 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX system 16, and, in some implementations, the DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some implementations, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many implementations, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

The combined functions of the communications platform 14 in concert with other elements of FIG. 1 can be described as fixed-mobile convergence (FMC), and can provide for a variety of features such as: single number reach (calls to an enterprise phone 17, 19 can be forwarded to a mobile device 11); simultaneous ring (incoming calls ring concurrently to an enterprise phone 17. 19 and a mobile device 11); single voicemail (both enterprise and mobile voice mails are deposited in the same voice mailbox); mobile number protection (on outbound mobile-originated calls, the user's desk number is provided on the caller ID); true caller ID on inbound calls (inbound calls received on the mobile device 11 show the name and phone number of the actual caller); and enterprise phone-to-mobile transfer (the ability to transfer in-progress calls between the mobile device and the desk set).

The SMP architecture of FIG. 1 can use a cellular data path (e.g., from enterprise server 12 to relay 26 to PLMN 50 to mobile device 11) in parallel to the voice path (e.g., via the PBX 16) to carry signaling messages between the PBX 16 and the enterprise server 12, which can relay them to the SMP 18. As described elsewhere herein, the configuration involves an SMP 18 that connects to the PBX 16 and to the enterprise server 12; a DID number can be assigned to each mobile device 11. When a call is placed to the user's desk number, the PBX 16 can connect it to the SMP 18. The SMP 18 then can place a call to the user's desk set and concurrently send a call request through the enterprise server 12, which forwards it over the cellular data network to ring the mobile 11. When the call is answered on one device, the ringing is stopped on the other. When an outbound mobile call is placed, a client in the mobile device 11 sends a signaling message with the called party's number over the cellular data network to the enterprise server 12, which in turn signals SMP 18. The SMP 18 places a call to the mobile 11 and places a second call to the called party; the two calls are connected together in the SMP 18.

A SIM card or Universal Integrated Circuit Card (UICC) (USIM, RUIM, CSIM), typically on a removable SIM card, can store the International Mobile Subscriber Identity (IMSI) used to identify a subscriber on mobile communication devices (e.g., as mobile phones 11, computers, and other electronic communication devices). The SIM card can allow users to change mobile communication devices by removing the SIM card from one device and inserting it into another device. Using multiple SIM cards can allow the use of multiple services without the need to carry two communication devices at the same time. For example, the same mobile communication device, e.g., 11, can be used for business and private use with separate numbers and bills; or for travel, with an additional SIM for the country visited. Using multiple SIM cards allows the user to take advantage of different pricing plans for calls and text messages to certain destinations as well as mobile data usage.

MSISDN is a number uniquely identifying a voice subscription in a GSM or a UMTS mobile network. Simply put, it is the telephone number of the SIM card in a mobile/cellular phone. This abbreviation has several interpretations, the most common one being "Mobile Subscriber Integrated Services Digital Network" number.

The IMSI is generally used to identify a mobile subscriber. The MSISDN is used for routing calls to the subscriber. The MSISDN typically is the number dialed to connect a call to the mobile device. A SIM is uniquely associated to an IMSI, while the MSISDN can change in time (e.g. due to number portability), i.e. different MSISDNs can be associated to one SIM over the lifetime of the SIM.

As specified in 3GPP TS 31.102, the MSISDN can be written to a SIM card by the user and the carrier. While a communication device, e.g., 11, may work on a carrier's network without a valid MSISDN, a valid MSISDN is required on a SIM card for the device to gain the benefits of fixed-mobile convergence by operating with an SMP 18. But it is not uncommon that the MSISDN is either not written on the SIM card, or an incorrect MSISDN is written on the SIM card.

In some implementations of the technology, if the SMP client on the mobile communication device detects that the MSISDN on the current active SIM is invalid, then the SMP client can disable calling line identification restriction on the mobile (or the SMP can use Calling Line ID restriction override) and call the SMP. Where Automatic Number Identification (ANI) is available, lifting or overriding the restriction will be unnecessary. The SMP can answer the incoming call and use, IP, SIP or i1 to complete the association between the MSISDN and the user. Once this association is complete, the number, e.g., discovered through call display by the SMP, can be transmitted to the SMP client on the mobile device 11. Since the MSISDN file on the SIM is PIN protected as specified in 3GPP TS 31.102, the client can write the new value on the SIM for future use and inform the SMP through registration or other means.

In some implementations the SMP client can notify the SMP of a potential problem with the MSISDN, it can inform the SMP server that it will initiate a call to the SMP to start the user-to-MSISDN association. In some implementations the SMP can notify the SMP client of a potential problem with the MSISDN to trigger the user-to-MSISDN association process. Such notification can be via the PBX 16 or via the enterprise server 12.

In some implementations, the SMP can have a stored list of active phone numbers for each user associated with an IMSI or MCC (Mobile Country Code and MNC (Mobile Network Code). When the SMP client discovers a SIM with new valid MSISDN it can query the server for the appropriate phone number and populate correctly as stated above.

In another implementation SMP could trigger an Over The Air (OTA) SMS or BIP update to update the MSISDN elementary file on the SIM card to the appropriate value; assuming the MVS server has ties with the carrier OTA update system. In another implementation the SMP client can use USSD commands with the carrier network to query the number.

Other triggers for updating/revising/adding an MSISDN can include installation of a new SIM card, register with the SMP, the SMP initiates repopulate the SIM card for some other reason using the signaling channels, e.g., failed to establish a call.

Figure 2:
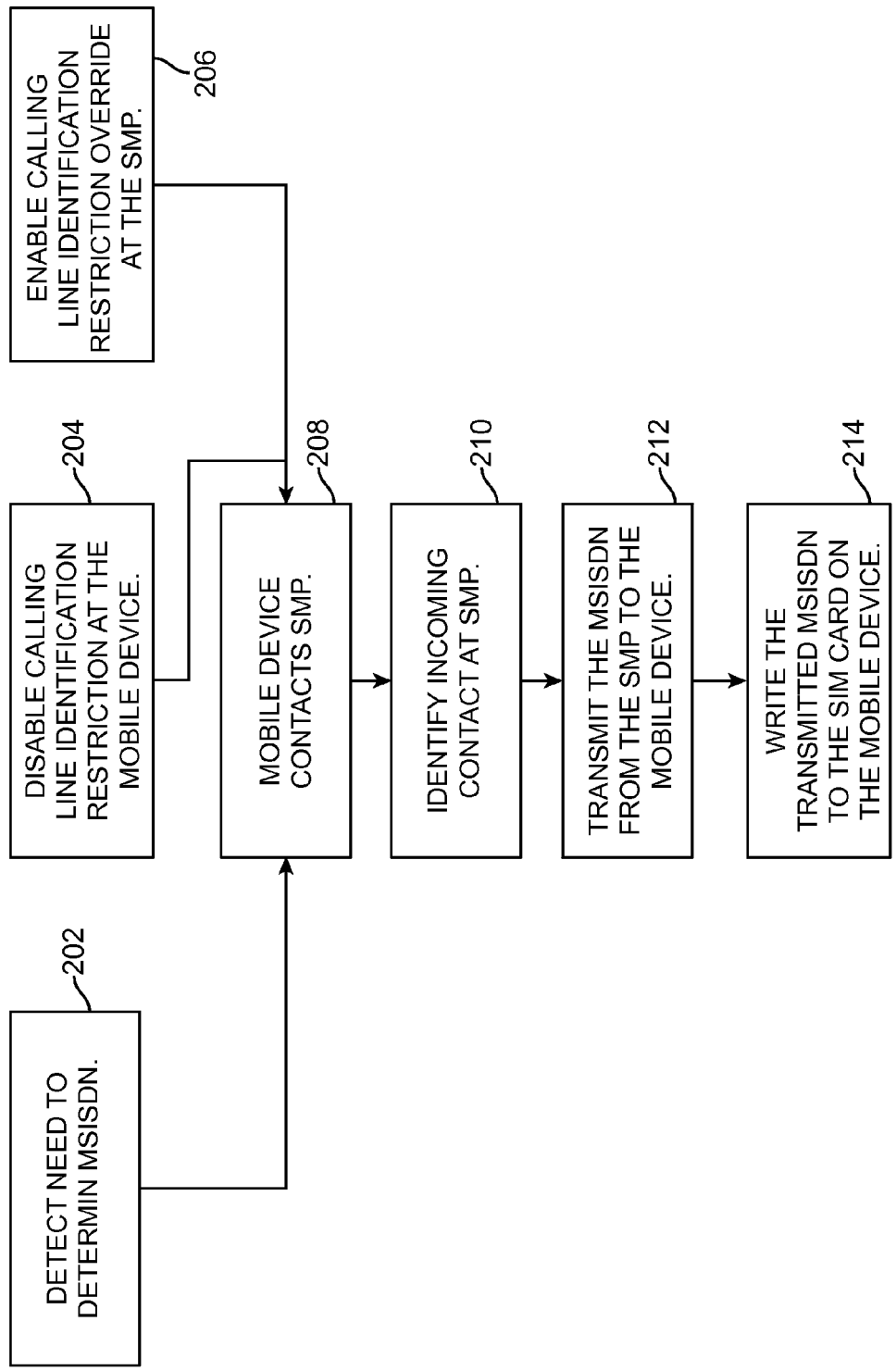
FIG. 2 illustrates methods of the technology.

Referring to FIG. 2, methods 200 of the technology for identifying an MSISDN of a mobile communication device in an extended enterprise voice network comprising the mobile device, an enterprise server, a PBX, and a service management platform SMP are illustrated. The need to determine an MSISDN is detected 202. For example, the need to determine an MSISDN can arise from detecting a new SIM card in the mobile device 11, or from detecting a missing MSISDN (e.g., upon failure of the SMP to contact the mobile device using an MSISDN known to the SMP).

At least one of the following can be implemented if ANI is not available: disabling calling line identification restriction at the mobile communication device 204, and enable calling line identification restriction override at the SMP 206. The mobile device contacts the SMP 208. For example, contacting the SMP can comprise calling the SMP via the PLMN and PSTN from the mobile communication device, or contacting via PLMN and enterprise server from the mobile communication device.

The incoming contact is identified at the SMP 210. For example, identification can be by identifying a calling number of an incoming call, or by identifying a hardware identifier for the mobile communication device; or by mapping the identified hardware identifier to an MSISDN though a hardware identifier/MSISDN lookup table; or by using i1 to associate between the MSISDN and a user.

The MSISDN is then transmitted to the mobile device from the SMP 212. For example, the MSISDN can be transmitted via hardware message (e.g., BlackBerry™ PIN message), SMS, or other data transfer via the PBX 16 or the enterprise server 12. The transmitted MSISDN is then written to the SIM card at the mobile device 214.

The present technology can take the forms of hardware, software or both hardware and software elements. In some implementations, the technology is implemented in software, which includes but is not limited to firmware, resident software, microcode, a Field Programmable Gate Array (FPGA), graphics processing unit (GPU), or Application-Specific Integrated Circuit (ASIC), etc. In particular, for real-time or near real-time use, an FPGA or GPU implementation would be desirable.

Furthermore, portions of the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be non-transitory (e.g., an electronic, magnetic, optical, electromagnetic, infrared, or semiconductor system (or apparatus or device)) or transitory (e.g., a propagation medium). Examples of a non-transitory computer-readable medium include a semi-conductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Both processors and program code for implementing each as aspect of the technology can be centralized or distributed (or a combination thereof) as known to those skilled in the art.

Referring to FIG. 5, a data processing system (e.g., 500) suitable for storing a computer program product of the present technology and for executing the program code of the computer program product can include at least one processor (e.g., processor resources 512) coupled directly or indirectly to memory elements through a system bus (e.g., 518 comprising data bus 518a, address bus 518b, and control bus 518c). The memory elements can include local memory (e.g., 516) employed during actual execution of the program code, bulk storage (e.g., 560), and cache memories (e.g., including cache memory as part of local memory or integrated into processor resources) that provide temporary storage of at least some program code in order to reduce the number of times code must be retrieved from bulk storage during execution. Input/output or I/O devices (including but not limited to keyboards 550, displays 530, pointing devices 520, etc.) can be coupled to the system either directly or through intervening I/O controllers (e.g., 514). Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The invention claimed is:

1. A computer-implemented method for identifying a mobile subscriber integrated services digital network number (MSISDN) of a mobile communication device in an extended enterprise voice network comprising the mobile communication device, an enterprise server, a private branch exchange (PBX), and a service management platform (SMP), the method comprising:
   detecting by a SMP client on the mobile communication device that the MSISDN of a current active Subscriber Identity Module (SIM) of the mobile communication device is invalid when the MSISDN is incorrect, the SIM being uniquely associated with an International Mobile Subscriber Identity (IMSI); and
   upon the detecting:
      disabling calling line identification restriction at the mobile communication device, when Automatic Number Identification is not available;
      initiating, from the mobile device, a call requesting an MSISDN that is valid and correct;
      receiving a transmission of the requested MSISDN at the mobile communication device, an association between the SMP client and the MSISDN having been completed using a Session Initiation Protocol after verification of an association between the IMSI, the SMP client and the MSISDN;
      writing the transmitted MSISDN to the active SIM of the mobile communication device; and
      informing the SMP of the writing.

2. The method of claim 1 wherein detecting that the MSISDN of the current active SIM is invalid comprises:
   detecting a new SIM card in the mobile communication device.

3. The method of claim 1 wherein requesting the MSISDN comprises:
   calling the SMP via a Public Land Mobile Network and a Public Switched Telephone Network from the mobile communication device.

4. The method of claim 1 wherein requesting the MSISDN comprises contacting the SMP via PLMN and enterprise server.

5. The method of claim 1 further comprising identifying the requesting mobile communication device at the SMP by identifying a calling number of incoming call.

6. The method of claim 1 further comprising identifying the requesting mobile communication device at the SMP comprising:
   identifying a hardware identifier for the mobile communication device; and
   mapping the identified hardware identifier to an MSISDN though a hardware identifier/MSISDN lookup table.

7. The method of claim 1 further comprising identifying the requesting mobile communication device at the SMP using i1 to associate between the MSISDN and a mobile communication device user.

8. A computer program product for identifying a mobile subscriber integrated services digital network number (MSISDN) of a mobile communication device in an extended enterprise voice network comprising the mobile communication device, an enterprise server, a private branch exchange (PBX), and a service management platform (SMP), the computer program product comprising:
   a non-transitory computer-readable medium encoded with instructions that when executed by processor resources:
      detects the need to determine an MSISDN;
      upon the detection, disables calling line identification restriction at the mobile communication device when Automatic Number Identification is not available;
      initiates a call from the mobile communication device requesting a determined MSISDN;
      receives transmission of the determined MSISDN at the mobile communication device, an association between a SMP client of the mobile communication device and the determined MSISDN having been completed using a Session Initiation Protocol after verification of an association between an International Mobile Subscriber Identity and the SMP client of the mobile communication device;
      writes the transmitted MSISDN to an SIM card at the mobile communication device; and
      informs the SMP of the writing.

9. The computer program product of claim 8 wherein detecting the need to determine an MSISDN comprises:
   detecting a new SIM card in the mobile communication device.

10. The computer program product of claim 8 wherein detecting the need to determine an MSISDN comprises:
    detecting a missing MSISDN on SIM card.

11. The computer program product of claim 8 wherein initiating the call comprises calling the SMP via a Public Land Mobile Network and a Public Switched Telephone Network from the mobile communication device.

12. The computer program product of claim 8 wherein initiating the call comprises contacting the SMP via a PLMN and the enterprise server from the mobile communication device.

13. The computer program product of claim 8 wherein the non-transitory computer-readable medium further identifies the requesting mobile communication device at the SMP by identifying a calling number of an incoming call.

14. The computer program product of claim 13 wherein identifying the requesting device at the SMP further comprises:

identifying a hardware identifier for the mobile communication device; map the identified hardware identifier to an MSISDN though a hardware identifier/MSISDN lookup table.

15. The computer program product of claim 13 wherein identifying the requesting device at the SMP further comprises:

using i1 to associate between the MSISDN and a user.

16. A system for identifying a mobile subscriber integrated services digital network number (MSISDN) of a mobile communication device in an extended enterprise voice network comprising the mobile communication device, an enterprise server, a private branch exchange (PBX), and a service management platform (SMP), the system comprising:

processor resources;

a non-transitory computer-readable medium:

in communication with the processor resources, and encoded with instructions that when executed by a processor:

detects the need to determine an MSISDN;

disables calling line identification restriction at the mobile communication device where Automatic Number Identification is not available;

initiates a call from the mobile communication device requesting a determined MSISDN, the call containing identifying information;

receives the requested MSISDN at the mobile communication device, an association between the MSISDN and a SMP client of the mobile communications device having been completed using an Session Initiation Protocol after verification of an association between an International Mobile Subscriber Identity and the SMP client of the mobile communications device;

writes the requested MSISDN to a SIM card at the mobile communication device; and informs the SMP of the writing.

17. The system of claim 16 wherein detecting the need to determine an MSISDN comprises:

detecting a new SIM card in the mobile communication device.

18. The system of claim 16 wherein detecting the need to determine an MSISDN comprises:

detecting a missing MSISDN on SIM card.

19. The system of claim 16 wherein requesting the determined MSISDN comprises:

calling the SMP via the Public Land Mobile Network and Public Switched Telephone Network from the mobile communication device.

20. The system of claim 16 wherein requesting the MSISDN comprises:

contacting the SMP via a PLMN and the enterprise server from the mobile communication device.

21. The system of claim 16 further comprising identifying an incoming contact associated with the requesting device at the SMP comprising:

identifying a calling number of an incoming call.

22. The system of claim 16 further comprising identifying the requesting mobile communication device at the SMP, wherein identifying comprises:

identifying a hardware identifier for the mobile communication device; and mapping the identified hardware identifier to an MSISDN though a hardware identifier/MSISDN lookup table.

23. The system of claim 16, further comprising identifying the requesting mobile communication device at comprises:

using i1 at the SMP to associate between the MSISDN and a user.

* * * * *